(12) United States Patent
Komori et al.

(10) Patent No.: US 8,183,721 B2
(45) Date of Patent: May 22, 2012

(54) OSCILLATION DRIVE DEVICE

(75) Inventors: Noriyuki Komori, Tokyo (JP); Atsushi Michimori, Tokyo (JP); Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 574 days.

(21) Appl. No.: 12/354,935

(22) Filed: Jan. 16, 2009

(65) Prior Publication Data

US 2009/0184775 A1 Jul. 23, 2009

(30) Foreign Application Priority Data

Jan. 18, 2008 (JP) ................................. 2008-009074

(51) Int. Cl.
*H02K 33/02* (2006.01)
*G03B 21/14* (2006.01)
(52) U.S. Cl. ................... 310/36; 359/199.3; 359/200.7; 359/209.1; 360/264.7
(58) Field of Classification Search .................... 310/36; 318/119; 359/199.1, 199.3, 200.7, 213.1, 359/221.2, 198.1, 209.1; 360/264.7
See application file for complete search history.

(56) References Cited

U.S. PATENT DOCUMENTS

| | | | | |
|---|---|---|---|---|
| 4,317,611 A | * | 3/1982 | Petersen | 359/214.1 |
| 5,428,473 A | * | 6/1995 | Takizawa et al. | 359/199.1 |
| 5,982,521 A | * | 11/1999 | Bessho et al. | 359/198.1 |
| 6,002,506 A | * | 12/1999 | Suzuki et al. | 359/198.1 |
| 6,008,924 A | * | 12/1999 | Ikegame | 359/198.1 |
| 6,486,995 B2 | * | 11/2002 | Nishikawa et al. | 359/198.1 |
| 7,235,778 B2 | * | 6/2007 | Asai | 250/235 |
| 2005/0018322 A1 | * | 1/2005 | Ben-Gad et al. | 359/846 |

FOREIGN PATENT DOCUMENTS

| | | |
|---|---|---|
| JP | 04-299058 A | 10/1992 |
| JP | 5-326603 A | 12/1993 |
| JP | 2003-57586 A | 2/2003 |
| JP | 2004-102249 A | 4/2004 |
| JP | 2005-293718 A | 10/2005 |
| JP | 2007-082272 A | 3/2007 |
| JP | 2008-542849 A | 11/2008 |
| WO | WO-2006/131916 | 12/2006 |

* cited by examiner

*Primary Examiner* — Burton Mullins
(74) *Attorney, Agent, or Firm* — Birch, Stewart, Kolasch & Birch, LLP

(57) ABSTRACT

An oscillation drive device includes an oscillating unit that includes attaching portions on either sides thereof, the attaching portions being arranged on an oscillation axis; a base that includes an oscillating fulcrum that supports the oscillating unit on the oscillation axis and supporting portions that firmly support the oscillating unit; and a pair of strip-shaped leaf springs that is arranged so as to intersect with the oscillation axis and oscillates the oscillating unit on the oscillation axis, each of the strip-shaped leaf springs includes a fixing portion attached to the attaching portions of the oscillating unit; and a flexible beam portion that both ends of which are attached to the supporting portions of the base, and causes the oscillating unit to oscillate on the base by flexure behavior thereof.

8 Claims, 7 Drawing Sheets

CENTER POSITION
OF SIDE WHERE THRUST FORCE (F)
IS PRODUCED

SIDE OF COIL
WHERE THRUST FORCE
IS PRODUCED

CROSS SECTION
A-A

OSCILLATION DRIVE DEVICE

BACKGROUND OF THE INVENTION

1. Field of the Invention

The present invention relates to an oscillation drive device including a voice coil motor that makes an oscillatory movement thereby shifting pixels of an image projected by a projection-type image display apparatus.

2. Description of the Related Art

Recently, a pixel shifting device has been employed in a projection-type image display apparatus that projects a light on an image thereby projecting the image onto a screen. The pixel shifting device includes a glass through which the projected light passes before reaching the screen and an actuator (an oscillation drive device) that causes the glass to oscillate. Because of the oscillation of the glass, the projected light oscillates and slightly shifts before reaching the screen. The glass is oscillated in such as manner that each pixel of the image is shifted by a half pixel on the screen. By such a pixel shift, the number of apparent pixels is increased, so that the resolution of the image can be improved.

A voice coil motor is typically used as the actuator. The voice coil motor includes a cylindrical coil, a cup-like outer yoke that encloses the coil from the outside, a permanent magnet that is arranged in the center of inside the outer yoke (inside the coil), and an inner yoke that is arranged on an upper end of the permanent magnet.

On the other hand, oscillatory apparatuses are known in the art. Such oscillatory apparatuses also employ a cylindrical voice coil motor to produce oscillation. In case of the oscillatory apparatuses, however, the center of oscillation is located outside the voice coil motor and also located midway between a moving part of the oscillatory apparatus and the voice coil motor. Such an oscillatory apparatus has been disclosed, for example, in Japanese Patent Application Laid-open No. H5-326603 (see page 2 and FIG. 1).

A cylindrical voice coil motor efficiently produces a thrust force over the entire circumference of a coil. However, a cup-like yoke and the like used in a cylindrical voice coil motor is difficult to machine. Therefore, there is generally employed such a voice coil motor that a yoke (a center yoke) made of a metal plate is arranged in a hole portion of a rectangular toroidal coil, and one magnet is arranged on a position across one side of the coil.

In this voice coil motor, it is configured that an end of a yoke arranged on the back side of the magnet (a back yoke) is in contact with an end of the center yoke. By this configuration, a magnetic flux of the magnet runs in cycle, and thereby improving the efficiency of the voice coil motor.

In the voice coil motor including the rectangular toroidal coil, if a side of the coil located farthest away from the center of oscillation is caused to function as the voice coil motor, it is possible to increase the torque. Furthermore, if the side of the coil serving as the voice coil motor is arranged farther away from the center of oscillation, it is possible to obtain a higher torque with a lower thrust force.

However, typical coils are made of copper wire, so that the coil is relatively large in mass among oscillatory components. Therefore, if the side of the coil serving as the voice coil motor is arranged too far away from the center of oscillation, the moment of inertia is increased, and thus it is difficult to achieve a high-speed oscillatory movement. Furthermore, an oscillation drive device for shifting pixels has been expected to be downsized in accordance with the development of a slimmed-down and downsized projection-type image display apparatus.

SUMMARY OF THE INVENTION

It is an object of the present invention to at least partially solve the problems in the conventional technology.

According to an aspect of the present invention, there is provided an oscillation drive device includes an oscillating unit that includes attaching portions on either sides thereof, the attaching portions being arranged on an oscillation axis; a base that includes an oscillating fulcrum that supports the oscillating unit on the oscillation axis in an oscillating manner and supporting portions that firmly support the oscillating unit, the oscillating fulcrum being arranged in a substantially center part of the base, and the supporting portions being formed on four corners of the base; and a pair of strip-shaped leaf springs that are arranged so as to intersect with the oscillation axis and oscillate the oscillating unit on the oscillation axis, each of the strip-shaped leaf springs includes a fixing portion that is formed in a substantially center part of the strip-shaped leaf spring and attached to the attaching portions of the oscillating unit; and a flexible beam portion that both ends of which are attached to the supporting portions of the base, and causes the oscillating unit to oscillate on the base by flexure behavior thereof.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
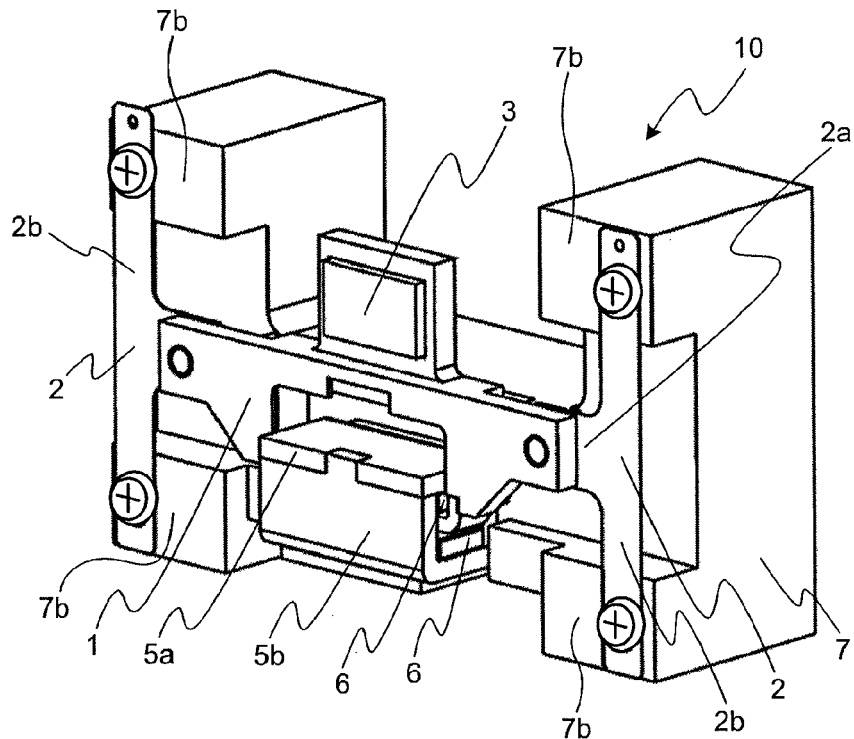
FIG. 1 is a perspective view of an oscillation drive device according to a first embodiment of the present invention.
Figure 2:
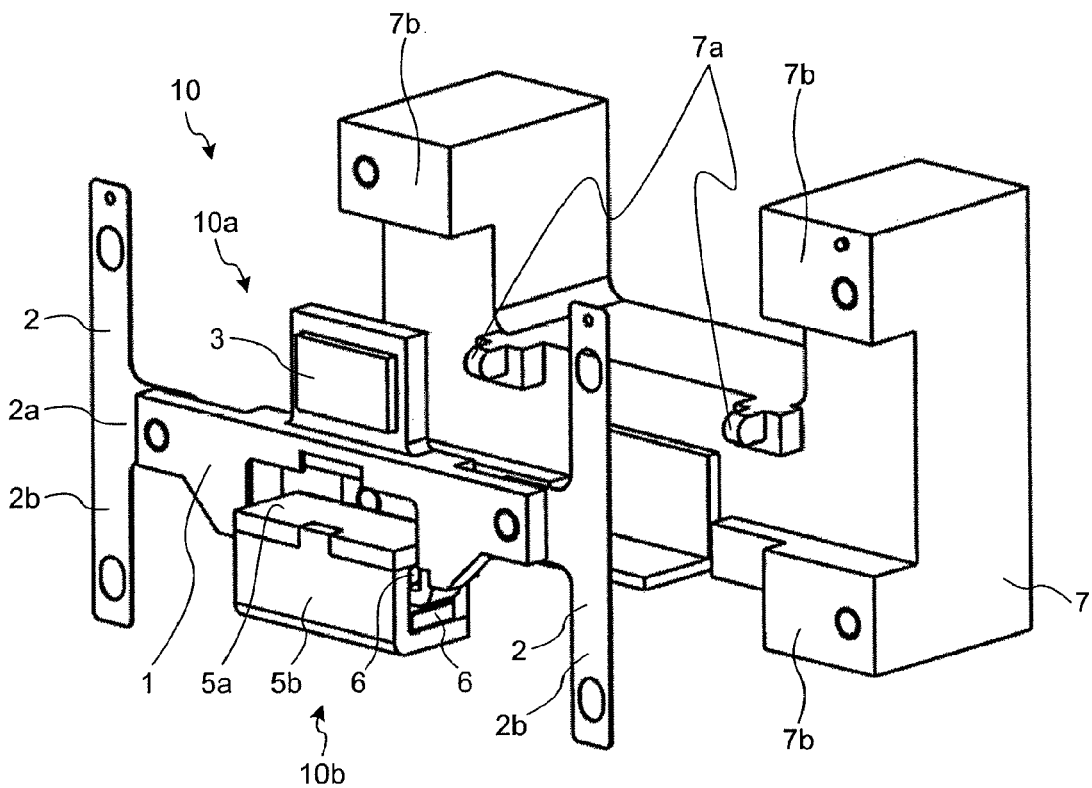
FIG. 2 is an exploded perspective view of the oscillation drive device shown in FIG. 1.
Figure 3:
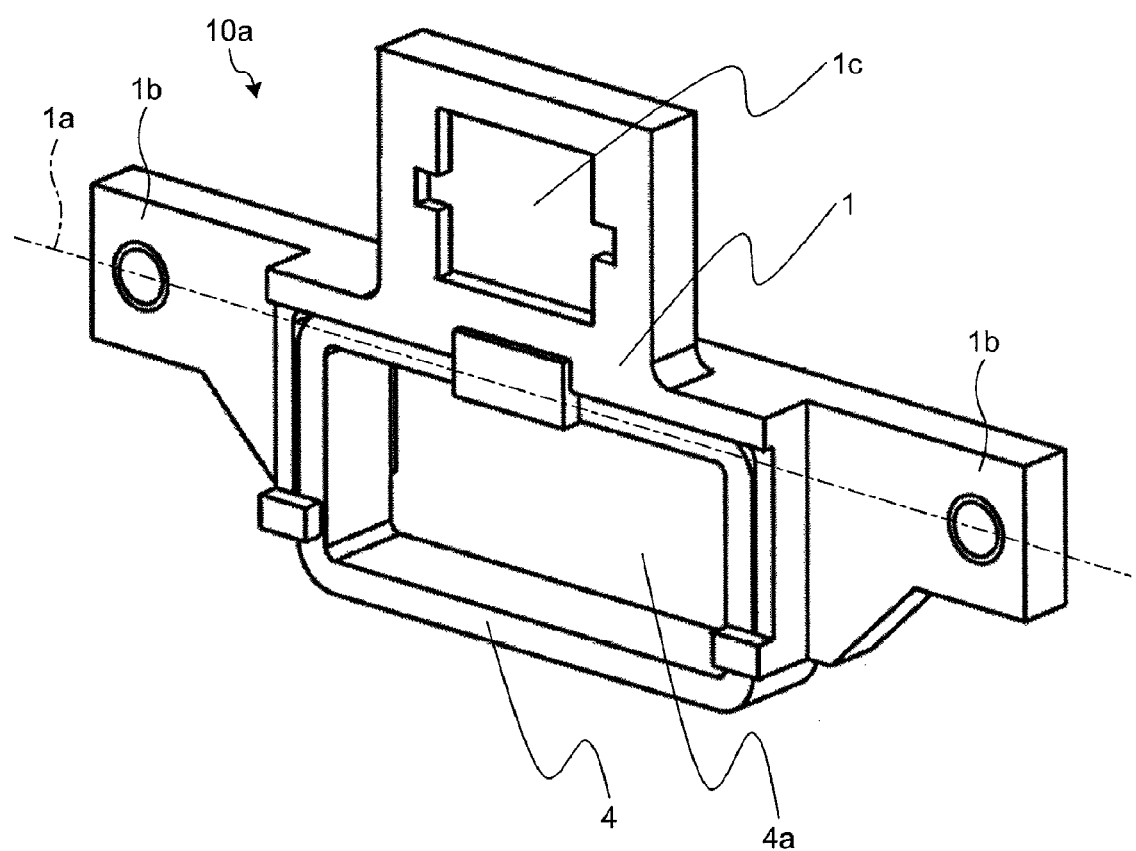
FIG. 3 is an enlarged perspective view of an oscillating unit shown in FIG. 2.
Figure 4A:
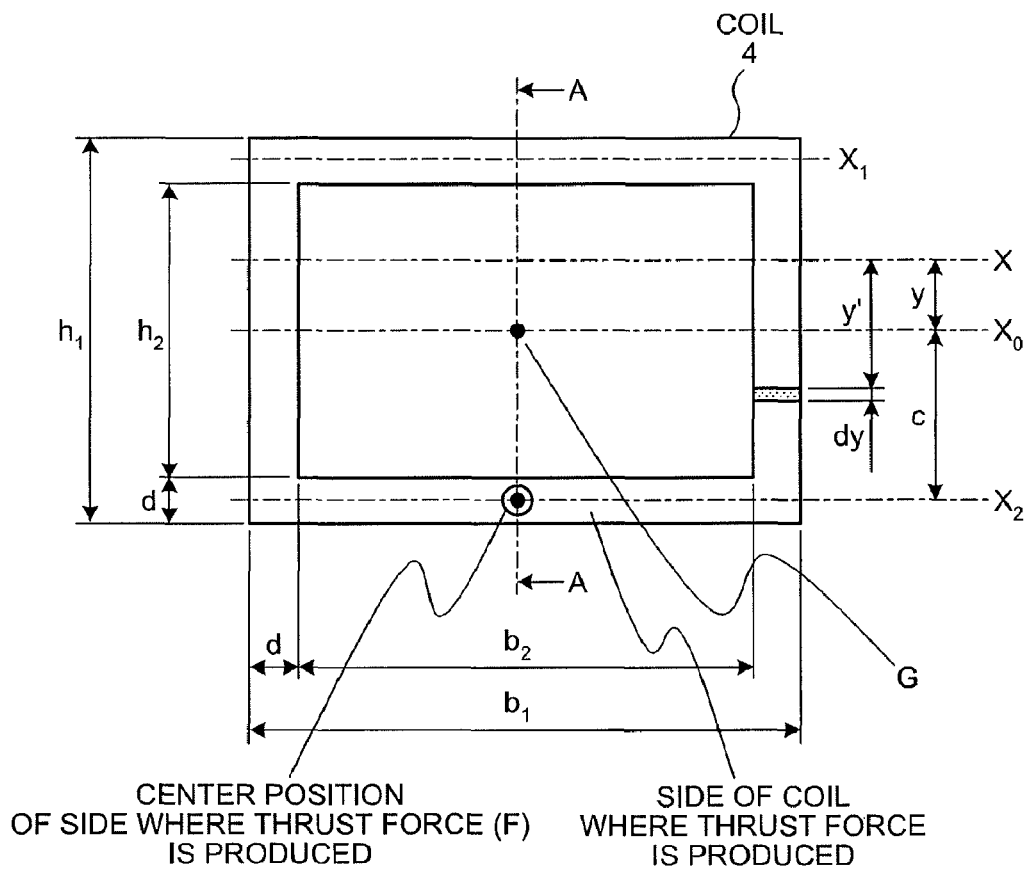
FIG. 4A is a front view of a rectangular toroidal coil shown in FIG. 3.
Figure 4B:
FIG. 4B is a longitudinal cross-sectional view of the rectangular toroidal coil along a line A-A shown in FIG. 4A.
Figure 5:
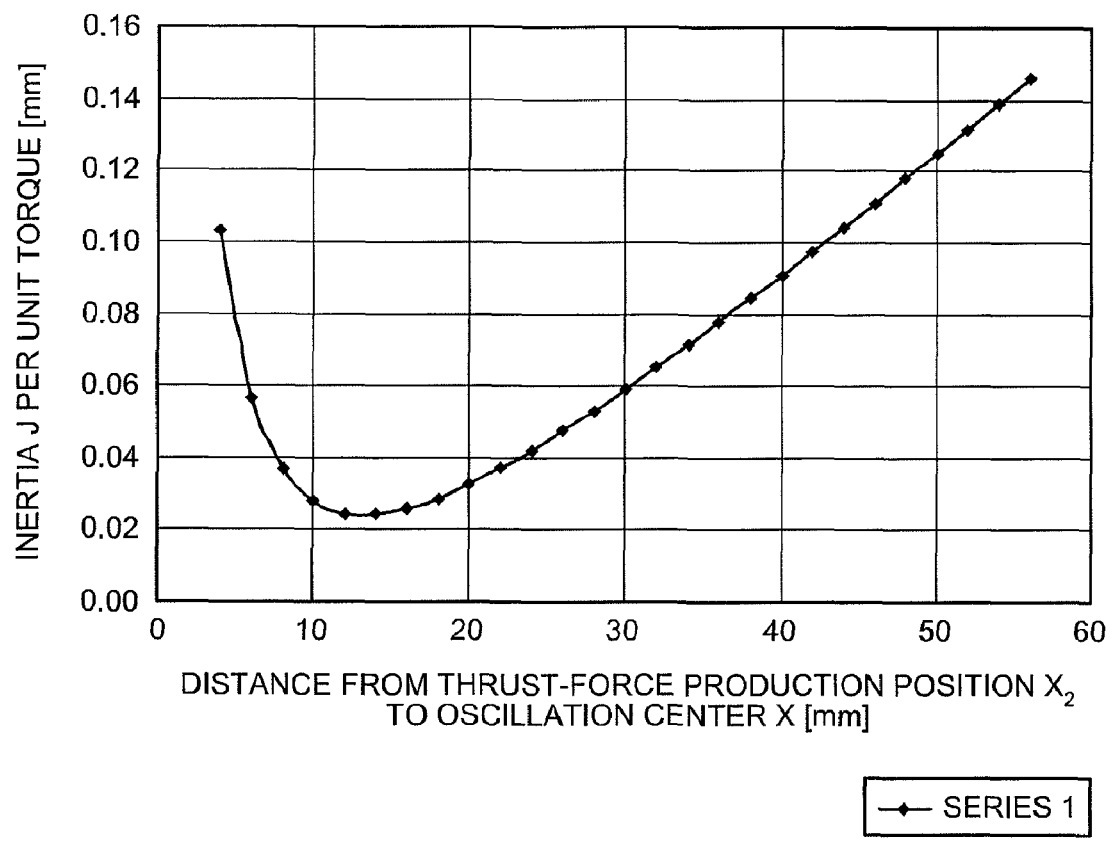
FIG. 5 is a graph showing the relation between inertia per unit torque and arm length of torque.

FIG. 1 is a perspective view of an oscillation drive device 10, i.e., a pixel shifting device, according to a first embodiment of the present invention. FIG. 2 is an exploded perspective view of the oscillation drive device 10. FIG. 3 is a perspective view of an oscillating unit 10a shown in FIG. 2. FIG. 4A is a front view of a rectangular toroidal coil 4 shown in FIG. 3. FIG. 4B is a longitudinal cross-sectional view of the rectangular toroidal coil 4 along the line A-A shown in FIG. 4A. FIG. 5 is a graph showing the relation between the inertia per unit torque and an arm length of the torque. Incidentally, the oscillation drive device 10 is employed in a projection-type image display apparatus as a pixel shifting device.

As shown in FIGS. 1 to 3, a glass 3, the rectangular toroidal coil 4, and two strip-shaped leaf springs 2 are mounted on a flap 1. A light projected from the projection-type image display apparatus passes through the glass 3. The strip-shaped leaf springs 2 are bent by the action of a thrust force produced by the coil 4, and cause a reaction to the bending. The flap 1, the glass 3, and the coil 4 compose the oscillating unit 10a.

The flap 1 holds the rectangular toroidal coil 4 on the lower side of an oscillation axis 1a, and holds the glass 3 in a window portion 1c of which located on the upper side of the oscillation spindle 1a. The flap 1 includes an attaching portion 1b on each side thereof. The attaching portions 1b are arranged to be located on the oscillation axis 1a.

The oscillating unit 10a is fixed to a base 7. The base 7 includes two oscillating fulcrums 7a and four supporting portions 7b. The oscillating fulcrums 7a are arranged in the substantially center part of the base 7 with keeping a distance from each other. The oscillating fulcrums 7a support the flap 1. The supporting portions 7b are formed on four corners of the base 7.

The strip-shaped leaf springs 2 are formed in T-shape. The strip-shaped leaf springs 2 are arranged so as to intersect with (be perpendicular to) the oscillation axis 1a of the flap 1. The base of each of the T-shaped strip-shaped leaf springs 2 are attached to the attaching portions 1b of the flap 1. End portions of the hands of the T-shaped strip-shaped leaf springs 2 are attached to the supporting portions 7b of the base 7. In the state that the oscillating unit 10a is fixed to the base 7, the oscillating fulcrums 7a come in contact with and support the flap 1 along the oscillation axis 1a. Namely, the flap 1 oscillates on the base 7 by flexure behavior of the strip-shaped leaf springs 2.

The glass 3 is arranged on the opposite side of the coil 4 across the oscillation axis 1a. Each of the strip-shaped leaf springs 2 includes a torsional beam portion 2a and a flexible beam portion 2b. The torsional beam portion 2a is provided in the substantially center part of each of the strip-shaped leaf springs 2, and extends inward, i.e., toward a center of the oscillating unit 10a. The flexible beam portion 2b intersects with the torsional beam portion 2a, i.e., intersects with the oscillation axis 1a. By the oscillatory movement of the flap 1, a reaction to the torsion of the torsional beam portion 2a and a reaction to the flexure of the flexible beam portion 2b are caused, whereby a biasing force is applied to the coil 4.

A voice coil motor 10b is fixed to the flap 1. The voice coil motor 10b is composed of the rectangular toroidal coil 4, which is fixed to the flap 1, two L-shaped yokes 5a and 5b, and two permanent magnets 6. The yoke 5a is arranged in a hole portion 4a of the coil 4, and supported by the base 7. The yoke 5b is arranged outside the coil 4, and supported by the base 7. The permanent magnets 6 are respectively fixed on inner surfaces of the yokes 5a and 5b so as to be located above and below across the coil 4. The L-shaped yokes 5a and 5b are arranged so that both end portions of which are in contact with that of the other yoke. Magnetic field lines (a magnetic flux) from a north pole of one of the magnets 6 run into a south pole of the other of the magnet 6.

When an electrical current is passed through the coil 4, a thrust force in a direction perpendicular to the magnetic field lines crossing the coil 4 in an up-and-down direction in FIG. 1 is produced. By the action of this thrust force, the flap 1 oscillates on the oscillating fulcrums 7a against the reaction of the strip-shaped leaf springs 2.

The glass 3 and the coil 4, which are fixed to the flap 1, oscillate along with the oscillation of the flap 1. Assume that the flap 1 has a mass of 1.5 grams (g), the glass 3 has a mass of 0.7 g, and the coil 4 has a mass of 2.1 g. The mass of the coil 4 accounts for about a half of the total mass of these three oscillating elements. Therefore, to improve response characteristics of the oscillation drive device 10, it is essential to reduce the moment of inertia of the coil 4.

A dimension of the rectangular toroidal coil 4 viewed from the front side is expressed by that is shown in FIGS. 4A and 4B, i.e., an outside width is expressed by "$b_1$", an outside height is expressed by "$h_1$", an inside width is expressed by "$b_2$", and an inside height is expressed by "$h_2$". Furthermore, the center of oscillation is denoted by an oscillation axis "X" (corresponding to the oscillation axis 1a in FIG. 3), an axis (a centroidal axis) parallel to the oscillation axis X and passing through a centroid G is denoted by an axis "$X_0$", a distance between the axis $X_0$ and an axis $X_2$ passing through the center of the coil winding where the thrust force is produced is denoted by "c", a thickness of the coil 4 is denoted by "d", a depth of the coil 4 is denoted by "t", and a mass per unit volume of the coil 4 is denoted by "$\rho$".

The inertia I of the coil 4 is expressed by the product of a mass of each tiny portion of the coil 4 and the square of a distance between the tiny portion and the oscillation axis X. Now, as shown in FIG. 4A, assume an arbitrary tiny portion "dy" of the coil 4 located at a distance "y'" from the oscillation axis X and with a mass dM. The mass dM can be expressed by the following Equation (1):

$$dM = \rho \cdot t \cdot dy \cdot d \quad (1)$$

Therefore, for example, the inertia I of the tiny portion "dy" can be expressed by the following Equation (2):

$$I = \rho \cdot t \cdot dy \cdot d \cdot y^2 \quad (2)$$

When corresponding parameters shown in FIGS. 4A and 4B are assigned to the Equation (2), based on the well-known formula for calculating the geometrical moment of inertia, the inertia I of the coil 4 around the oscillation axis X can be expressed by the following Equation (3) with a distance "y" between the axis $X_0$ and the oscillation axis X:

$$I = \rho \cdot t(b_1 \cdot h_1 - b_2 \cdot h_2)y^2 + \rho \cdot t(b_1 \cdot h_1^3 - b_2 \cdot h_2^3)/12 \quad (3)$$

Furthermore, when a thrust force F is produced on a lower side of the rectangular toroidal coil 4, a torque T around the oscillation axis X is expressed by the following Equation (4):

$$T = F \cdot (y+c) \quad (4)$$

The inertia J per unit torque T is expressed by "J=I/T", i.e., is expressed by the following Equation (5) based on Equations (3) and (4):

$$J = \rho \cdot t \left( \frac{b_1 \cdot h_1 -}{b_2 \cdot h_2} \right) y^2 / F(y+c) + \rho \cdot t \left( \frac{b_1 \cdot h_1^3 -}{b_2 \cdot h_2^3} \right) / 12F(y+c) \quad (5)$$

For example, when "$b_1=25$ mm", "$b_2=22$ mm", "$h_1=22$ mm", "$h_2=18$ mm", "$t=5$ mm", "$c=10$ mm", "$\rho=4.84 \cdot 10^{-6}$ kg/mm$^3$", and "$F=1$ N" are filled into Equation (5), a graph shown in FIG. 5 is obtained.

When the center of oscillation, i.e., the oscillation axis X is located above an axis $X_1$ shown in FIG. 4A (a position meeting a condition of "$X=(h_1+h_2)/2=20$" in FIG. 5), i.e., outside of the coil 4, the inertia J increases in a linear fashion as shown in FIG. 5. On the other hand, when the oscillation axis X is located below the axis $X_1$, i.e., inside of the coil 4, an arm length with respect to each portion of the coil 4 is different depending on the position of the portions.

For example, in FIG. 4A, when an arm length from the oscillation axis X to the axis $X_2$ is long, an arm length from the oscillation axis X to the axis $X_1$ becomes short. Therefore, the inertia increases in a side of the coil 4 on the side of the axis $X_2$, and decreases in a side of the coil 4 on the side of the axis $X_1$.

When the oscillation axis X is located outside the coil 4, an arm length with respect to the entire coil 4 becomes long. Therefore, an amount of increase in inertia becomes larger than that is obtained when the oscillation axis X is located inside the coil 4. Furthermore, when the center of oscillation, i.e., the oscillation axis X is located closer to the side of a thrust-force production position (i.e., on the lower side in FIG. 4A, and a position meeting a condition of "$X=0=X_2$" in FIG. 5) than the axis $X_0$ shown in FIG. 4A (a position meeting a condition of "$X=X_1/2=10$" in FIG. 5), a value of the inertia J increases sharply.

In view of these facts, to reduce a value of inertia per unit torque, curb the influence of inertia of the coil 4, and make the oscillating unit oscillate at high speed, it is preferable that the oscillation axis X of the coil 4 be located between the axis $X_0$ and the axis $X_1$ as shown in FIG. 4A.

However, if the oscillation drive device 10 is configured so that the coil 4 overlaps with the center of oscillation, the oscillating fulcrums 7a are located on the outer side of the coil 4 in the oscillating direction. Furthermore, the torsional beam portions 2a of the strip-shaped leaf springs 2 are arranged on the oscillation axis 1a, so that the strip-shaped leaf springs 2 are located on the outer side of the oscillating fulcrums 7a on the oscillation axis 1a. In this configuration, the coil 4, the oscillating fulcrums 7a, and the strip-shaped leaf springs 2 are laid out in a line in the direction of the oscillation axis 1a. Therefore, the oscillation drive device 10 grows in size. In other words, the oscillation drive device 10 can not be downsized.

To downsize the oscillation drive device 10 in the direction of the oscillation axis 1a, one approach is to eliminate the torsional beam portion 2a from the strip-shaped leaf spring. That is, a strip-shaped leaf spring including the flexible beam portion 2b only can be used instead of the strip-shaped leaf spring 2. For the sake of simplicity, such a strip-shaped leaf spring is referred to as a strip-shaped leaf spring 21. The strip-shaped leaf spring 21 includes only the flexible beam portion 2b that causes a reaction to the flexure thereof. By eliminating the torsional beam portions 2a, the inertia of the oscillating unit 10a can be reduced, and response characteristics of the oscillating unit 10a can be improved. In addition, it is possible to downsize the oscillation drive device 10.

Figure 6:
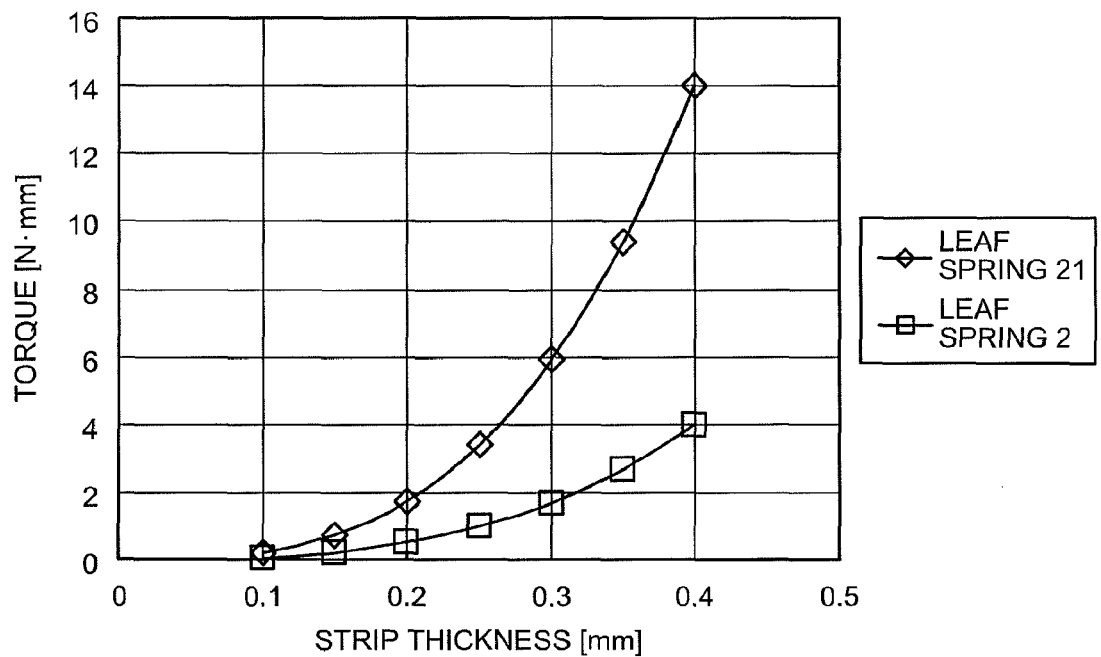
FIG. 6 is a graph showing a fluctuation in spring reaction caused when the oscillating unit is tilted at an angle of 0.2 degree with respect to a fluctuation in strip thickness of a strip-shaped leaf spring used in the oscillation drive device shown in FIG. 1.
Figure 7:
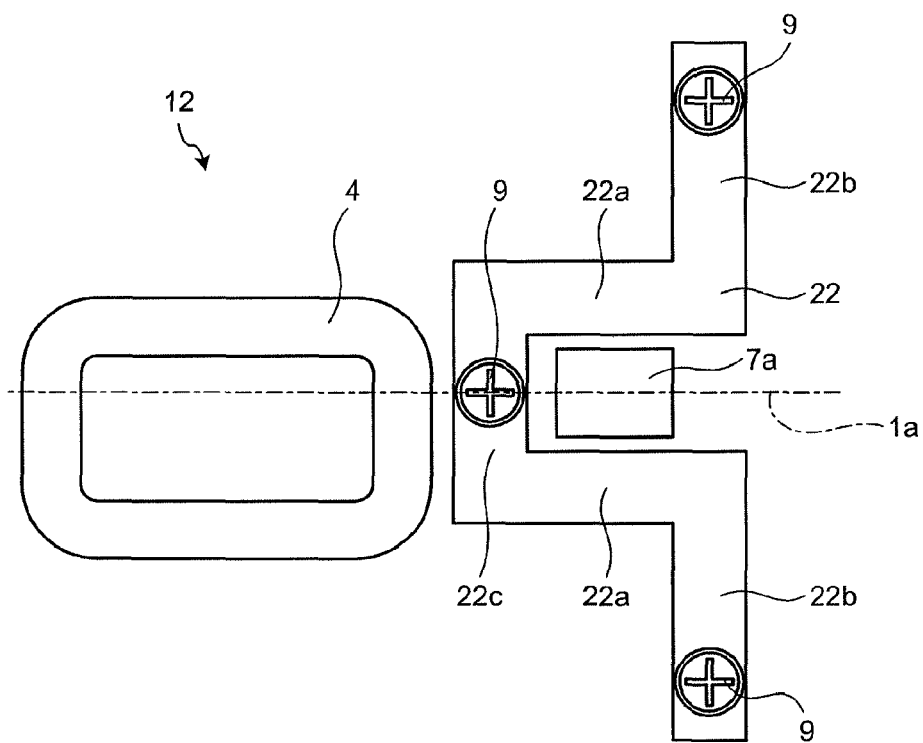
FIG. 7 is a front view for explaining a configuration of a strip-shaped leaf spring used in an oscillation drive device according to a second embodiment of the present invention.
Figure 8:
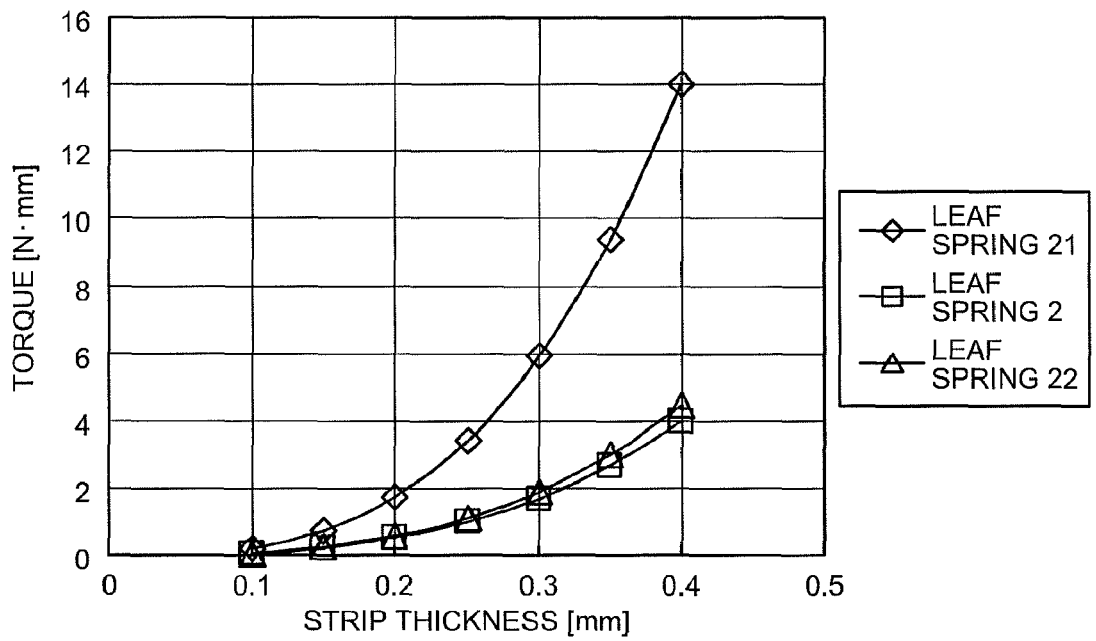
FIG. 8 is a graph showing the relation between strip thickness and spring reaction of the strip-shaped leaf spring shown in FIG. 7.

FIG. 6 is a graph showing fluctuation in spring reaction caused when the oscillating unit 10a is tilted at an angle of 0.2 degree with respect to fluctuation in strip thickness of each of the strip-shaped leaf springs 2 and 21 those used in the first embodiment. FIG. 7 is a front view for explaining a configuration of a strip-shaped leaf spring 22 employed in an oscillation drive device 12 according to a second embodiment of the present invention. FIG. 8 is a graph showing the relation between strip thickness and spring reaction of the strip-shaped leaf spring 22.

In the first embodiment, there is explained how the strip-shaped leaf spring 21, including the flexible beam portion 2b only, enables the downsizing of the oscillation drive device 10 while reducing the inertia of the oscillating unit 10a and improving the response characteristics of the oscillating unit 10a. In the second embodiment, the oscillation drive device 12 includes the strip-shaped leaf spring 22 (see FIG. 7) that remains a portion corresponding to the torsional beam portion 2a thereby enabling further downsizing of the oscillation drive device 12.

In general, an allowable tolerance of strip thickness of stainless steel strip used in making a leaf spring is about plus or minus 10% of the strip thickness. For example, when a steel strip having a thickness of 0.25 mm is used, the strip thickness of the steel strip fluctuates between 0.225 mm and 0.275 mm. When a steel strip having a thickness of 0.35 mm is used, the strip thickness of the steel strip fluctuates between 0.325 mm and 0.375 mm.

As shown in FIG. 6, in case of the strip-shaped leaf spring 21, spring reaction (the torque) of 3.423 N·mm is caused when the strip thickness is 0.25 mm, spring reaction of 2.497 N·mm is caused when the strip thickness is 0.225 mm, and spring reaction of 4.553 N·mm is caused when the strip thickness is 0.275 mm. Therefore, in the strip-shaped leaf spring 21, there is about 30% disparity in spring reaction between the strip thickness of 0.25 mm and the strip thickness of 0.225 mm or 0.275 mm.

On the other hand, in case of the strip-shaped leaf spring 2 having a standard strip thickness of 0.35 mm, which is required to obtain the torque equivalent to that is in the strip-shaped leaf spring 21, as shown in FIG. 6, spring reaction (the torque) of 2.696 N·mm is caused. When the strip thickness of the strip-shaped leaf spring 2 is 0.325 mm, the spring reaction of 2.162 N·mm is caused, and when the strip thickness of the strip-shaped leaf spring 2 is 0.375 mm, the spring reaction of 3.311 N·mm is caused. Therefore, in the strip-shaped leaf spring 2, there is about 20% disparity in spring reaction between the strip thickness of 0.35 mm and the strip thickness of 0.325 mm or 0.375 mm.

To obtain the torque equivalent to that is in the strip-shaped leaf spring 21 with the strip-shaped leaf spring 2 having a strip thickness other than the standard strip thickness, when the strip-shaped leaf spring 2 has a strip thickness of 0.38 mm, the spring reaction of 3.445 N·mm is caused. When the strip-shaped leaf spring 2 has a strip thickness of 0.355 mm, the spring reaction of 2.813 N·mm is caused, and when the strip-shaped leaf spring 2 has a strip thickness of 0.405 mm, the spring reaction of 4.164 N·mm is caused. Thus, there is about 20% disparity in spring reaction between the strip thickness of 0.38 mm and the strip thickness of 0.355 mm or 0.405 mm.

Such fluctuation in spring reaction due to the fluctuation in strip thickness causes a fluctuation in oscillation angle of the oscillating unit 10a when a constant current is passed through the coil 4. This leads to a fluctuation in amount of pixel shift and may degrade the image quality. Therefore, it is necessary to form the strip-shaped leaf spring to have a shape capable of reducing the fluctuation in spring reaction due to the fluctuation in strip thickness.

The difference between the strip-shaped leaf springs 2 and 21 is the presence or absence of the torsional beam portion 2a. Therefore, it is necessary to provide an element corresponding to the torsional beam portion 2a to the strip-shaped leaf spring 21 so as to cause a reaction to the torsion of the element.

FIG. 7 is a front view for explaining a configuration of the strip-shaped leaf spring 22 employed in the oscillation drive device 12 according to the second embodiment of the present invention. The portions identical to those for the first embodiment are denoted with the same reference numerals.

As shown in FIG. 7, the strip-shaped leaf spring 22 includes a fixing portion 22c, two torsional beam portions 22a, and two flexible beam portions 22b. The fixing portion 22c is for fixing the strip-shaped leaf spring 22 to the flap 1 (not shown in FIG. 7). The torsional beam portions 22a are connected to the fixing portion 22c, and respectively arranged above and below across the oscillating fulcrum 7a. The torsional beam portions 22a cause a reaction to the torsion thereof. The flexible beam portions 22b are connected to the torsional beam portions 22a so as to be perpendicular to the torsional beam portions 22a. The flexible beam portions 22b cause a reaction to the flexure thereof. The fixing portion 22c is arranged outside the coil 4 so as to be located on the oscillation axis 1a. The fixing portion 22c is fixed to the flap 1 with a screw 9. The oscillating fulcrum 7a as the center of oscillation of the flap 1 is arranged outside the fixing portion 22c.

In this arrangement, the oscillating fulcrum 7a and the torsional beam portions 22a can lap in the direction of the oscillation axis 1a. Therefore, a dimension of the oscillation drive device 12 along the oscillation axis 1a can be reduced even though the strip-shaped leaf spring 22 includes the torsional beam portions 22a, and also the fluctuation in spring reaction due to the fluctuation in strip thickness of the strip-shaped leaf spring 22 can be reduced.

As shown in FIG. 8, the strip-shaped leaf springs 2 and 22 have about the same characteristics as each other with respect to the fluctuation in strip thickness. The strip-shaped leaf spring 22 has the small fluctuation in spring reaction due to the fluctuation in strip thickness. Therefore, it is possible to achieve downsizing of the oscillation drive device 12 with the small fluctuation in oscillation angle of the flap 1 at the time of the pixel shift.

By the use of the strip-shaped leaf spring 22, it is possible to reduce the fluctuation in spring reaction due to the fluctuation in strip thickness and also reduce the fluctuation in oscillation angle of the flap 1. Therefore, the oscillation drive device 12 can have reduced fluctuation in amount of pixel shift, and thus the projection-type image display apparatus including the oscillation drive device 12 can achieve a high-resolution screen image. In addition, by the use of the strip-shaped leaf spring 22, the oscillation drive device 12 can be downsized.

Figure 9:
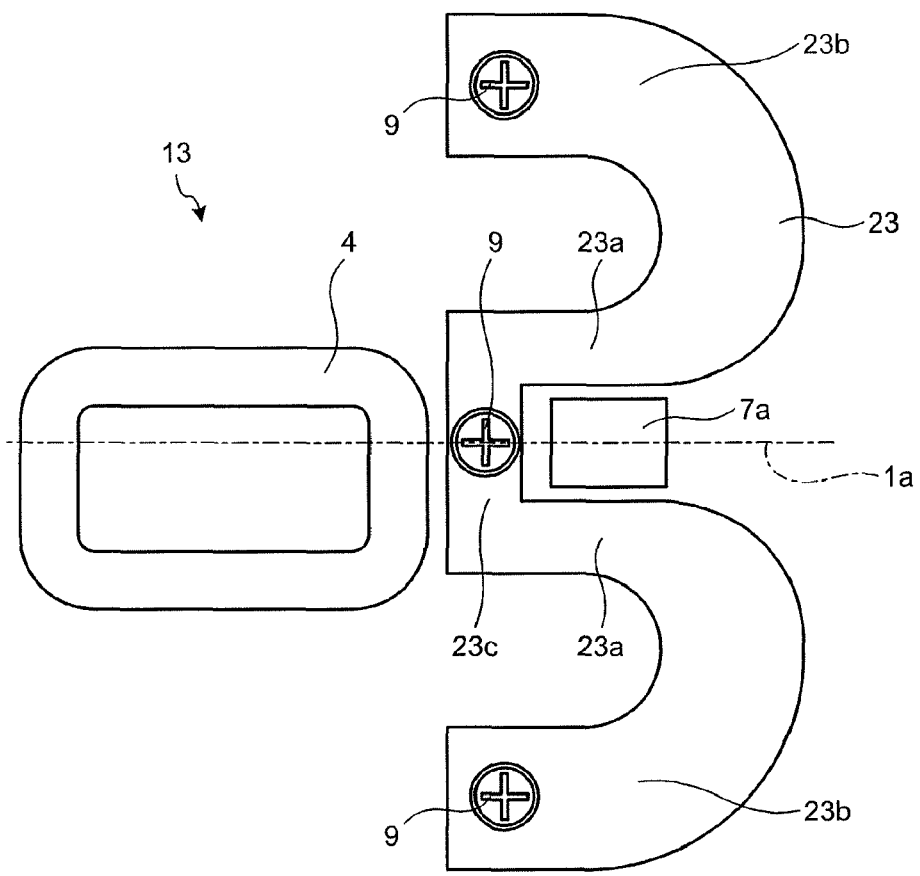
FIG. 9 is a front view of a strip-shaped leaf spring used in an oscillation drive device according to a third embodiment of the present invention.
Figure 10:
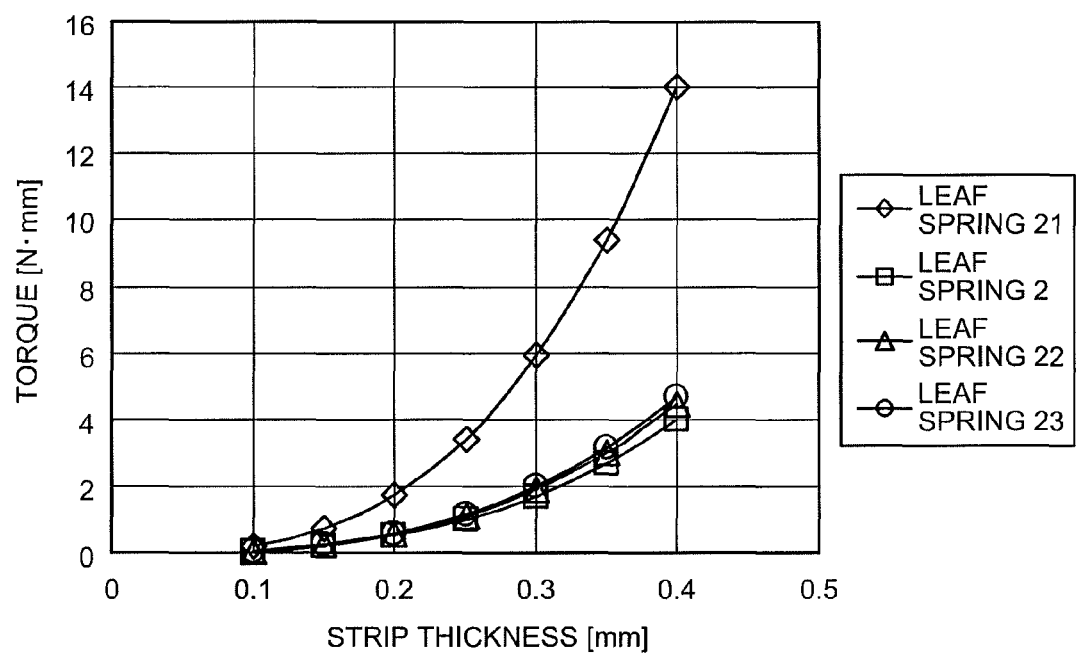
FIG. 10 is a graph showing the relation between strip thickness and spring reaction of the strip-shaped leaf spring shown in FIG. 9.

FIG. 9 is a front view for explaining a configuration of a strip-shaped leaf spring 23 employed in an oscillation drive device 13 according to a third embodiment of the present invention. FIG. 10 is a graph showing the relation between strip thickness and spring reaction of the strip-shaped leaf spring 23. The portions identical to those for the first and second embodiments are denoted with the same reference numerals.

In the second embodiment, the oscillation drive device 12 employs the strip-shaped leaf spring 22 including the torsional beam portions 22a that cause a spring reaction to the torsion thereof on the strip-shaped leaf spring 22. By the use of the strip-shaped leaf spring 22, the oscillation drive device 12 can be downsized. In the third embodiment, the oscillation drive device 13 employs the strip-shaped leaf spring 23 enabling downsizing in the direction of the oscillation axis 1a and the vertical direction.

The strip-shaped leaf spring 23 includes a fixing portion 23c, two torsional beam portions 23a, and two flexible beam portions 23b. The fixing portion 23c is for fixing the strip-shaped leaf spring 23 to the flap 1. The torsional beam portions 23a are connected to the fixing portion 23c, and respectively arranged above and below across the oscillating fulcrum 7a. The upper torsional beam portion 23a is curved upward, and the lower torsional beam portion 23a is curved downward. The flexible beam portions 23b are connected to curved end portions of the torsional beam portions 23a. The flexible beam portions 23b are curved inward so that end portions of which are parallel to the oscillation axis 1a. The fixing portion 23c is arranged outside the coil 4 so as to be located on the oscillation axis 1a. The oscillating fulcrum 7a as the center of oscillation of the flap 1 is arranged outside the fixing portion 23c.

By the above arrangement, the oscillating fulcrum 7a and the torsional beam portions 23a can lap in the direction of the oscillation axis 1a. Therefore, a dimension of the oscillation drive device 13 along the oscillation axis 1a can be reduced even though the strip-shaped leaf spring 23 includes the torsional beam portions 23a, and also the fluctuation in spring reaction due to the fluctuation in strip thickness of the strip-shaped leaf spring 23 can be reduced.

Furthermore, the flexible beam portions 23b that cause a reaction to the flexure thereof on the strip-shaped leaf spring 23 respectively have a curved shape, although the flexible beam portions 22b in the oscillation drive device 12 respectively have a linear shape. Therefore, the flexible beam portions 23b are partially parallel to the torsional beam portions 23a and the oscillation axis 1a. Thus, even though the strip-shaped leaf spring 23 includes the flexible beam portions 23b, the oscillation drive device 13 can be downsized in the direction of the oscillation axis 1a and the vertical direction.

As shown in FIG. 10, the strip-shaped leaf springs 2 and 23 have about the same characteristics as each other with respect to the fluctuation in strip thickness. The strip-shaped leaf spring 23 has the small fluctuation in spring reaction due to the fluctuation in strip thickness. Therefore, it is possible to achieve downsizing of the oscillation drive device 13 with the small fluctuation in oscillation angle of the flap 1 at the time of the pixel shift.

By the use of the strip-shaped leaf spring 23, it is possible to reduce the fluctuation in spring reaction due to the fluctuation in strip thickness and also reduce the fluctuation in oscillation angle of the flap 1. Therefore, the oscillation drive device 13 can have reduced fluctuation in amount of pixel shift, and thus the projection-type image display apparatus including the oscillation drive device 13 can achieve a high-resolution screen image. In addition, by the use of the strip-shaped leaf spring 23, the oscillation drive device 13 can be downsized.

According to an aspect of the present invention, it is possible to provide an oscillation drive device used for pixel shift of a projection-type image display apparatus while achieving a high-speed oscillatory movement and downsizing thereof.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An oscillation drive device comprising:
   an oscillating unit that includes an oscillation axis and an attaching portion;
   a base including an oscillating fulcrum and a supporting portion, the oscillating fulcrum being in contact with the oscillating unit at the oscillation axis and arranged substantially in the center of the base, the supporting portion being formed on the periphery of the base; and a strip-shaped leaf spring holding the oscillating unit in such manner that the oscillating unit oscillates on the oscillating fulcrum, the strip-shaped leaf spring including a fixing portion attached to the attaching portion of the oscillating unit arranged within the oscillating fulcrum;

a flexible beam portion, one end of which is attached to the supporting portion of the base; and torsional beam portions respectively arranged on two sides across the oscillating fulcrum in a direction perpendicular to the oscillation axis, each of the torsional beam portions being arranged substantially parallel to the oscillation axis, one end of each of the torsional beam portions being connected to the fixing portion while the other end is connected to the flexible beam portion.

2. The oscillation drive device according to claim 1, wherein the attaching portion is provided on the oscillation axis.

3. The oscillation drive device according to claim 1, wherein the flexible beam portion of the strip-shaped leaf spring is formed to be substantially perpendicular to the oscillation axis of the oscillating unit.

4. The oscillation drive device according to claim 1, wherein the oscillation unit further comprises a rectangular toroidal coil.

5. The oscillation drive device according to claim 4, wherein the rectangular toroidal coil is arranged so that the oscillation axis does not overlap a centroid of the rectangular toroidal coil.

6. The oscillation drive device according to claim 4, wherein the oscillating fulcrum is arranged outside the circumference of the rectangular toroidal coil.

7. An oscillation drive device comprising:

an oscillating unit that includes an oscillation axis and an attaching portion;

a base including an oscillating fulcrum and a supporting portion, the oscillating fulcrum being in contact with the oscillating unit at the oscillation axis and arranged substantially in the center of the base, the supporting portion being formed on the periphery of the base; and a strip-shaped leaf spring holding the oscillating unit in such manner that the oscillating unit oscillates on the oscillating fulcrum, the strip-shaped leaf spring including a fixing portion attached to the attaching portion of the oscillating unit arranged within the oscillating fulcrum;

a flexible beam portion, at least one end of which is attached to the supporting portion of the base; and a torsional beam portion arranged substantially parallel to the oscillation axis to hold the oscillating fulcrum, one end of the torsional beam connected to the fixing portion and the other end connected to the flexible beam portion, wherein the flexible beam portion extends outwardly from the one end attached to the supporting portion to be substantially parallel to the oscillation axis, and the flexible beam portion and the torsional beam portion are bent into a substantially U shape and connected to each other.

8. An oscillation drive device comprising:

an oscillating unit that includes an oscillation axis and an attaching portion;

a base including an oscillating fulcrum and a supporting portion, the oscillating fulcrum being in contact with the oscillating unit at the oscillation axis and arranged substantially in the center of the base, the supporting portion being formed on the periphery of the base; and a strip-shaped leaf spring holding the oscillating unit in such manner that the oscillating unit oscillates on the oscillating fulcrum, the strip-shaped leaf spring including a fixing portion attached to the attaching portion of the oscillating unit arranged within the oscillating fulcrum;

a flexible beam portion, at least one end of which is attached to the supporting portion of the base; and a torsional beam portion arranged substantially parallel to the oscillation axis to hold the oscillating fulcrum, one end of the torsional beam connected to the fixing portion and the other end connected to the flexible beam portion, wherein the oscillating unit further includes a rectangular toroidal coil on the lower side of the oscillation axis; and a glass through which a projection light can pass at a window portion on the upper side of the oscillation axis, the base includes a permanent magnet and a yoke for passing magnetic field lines to one side of the rectangular toroidal coil, and the oscillation axis is parallel to one side of the rectangular toroidal coil, and is located between an opposed side parallel to the one side of the rectangular toroidal coil and a centroid of the rectangular toroidal coil.

* * * * *